(12) United States Patent
Yamashita et al.

(10) Patent No.: US 9,707,820 B2
(45) Date of Patent: Jul. 18, 2017

(54) TUBE AND SHOCK ABSORBER

(71) Applicant: HITACHI AUTOMOTIVE SYSTEMS, LTD., Ibaraki (JP)

(72) Inventors: Mikio Yamashita, Zama (JP); Makoto Nishimura, Hachioji (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/779,645

(22) PCT Filed: Mar. 25, 2014

(86) PCT No.: PCT/JP2014/058304
§ 371 (c)(1),
(2) Date: Sep. 24, 2015

(87) PCT Pub. No.: WO2014/174966
PCT Pub. Date: Oct. 30, 2014

(65) Prior Publication Data
US 2016/0052361 A1 Feb. 25, 2016

(30) Foreign Application Priority Data
Apr. 26, 2013 (JP) .................................. 2013-094047

(51) Int. Cl.
*B60G 17/08* (2006.01)
*B60G 13/08* (2006.01)
(Continued)

(52) U.S. Cl.
CPC ............. *B60G 17/08* (2013.01); *B21D 17/04* (2013.01); *B21H 7/182* (2013.01); *B60G 13/08* (2013.01);
(Continued)

(58) Field of Classification Search
CPC ........ B60G 17/08; B60G 17/04; B60G 13/08; B21H 7/182; F16F 9/3235; F16F 9/36;
(Continued)

(56) References Cited

U.S. PATENT DOCUMENTS 8,079,600 B2 * 12/2011 Shojima ................. F16J 15/062
277/587
2003/0155198 A1 * 8/2003 Muller ................... B60G 11/27
188/322.19

(Continued)

FOREIGN PATENT DOCUMENTS

CN          86204629      6/1987
JP          61-139328     8/1986
(Continued)

OTHER PUBLICATIONS

International Search Report issued Jun. 24, 2014 in International Application No. PCT/JP2014/058304.
(Continued)

Primary Examiner — Vishal Sahni
(74) Attorney, Agent, or Firm — Wenderoth, Lind & Ponack, L.L.P.

(57) ABSTRACT

A tube having sealing ring grooves formed by a sequential rotational process and a shock absorber including the tube, in which durability of a sealing ring fitted in each of the sealing ring grooves is enhanced. An inclination angle ($\theta_1$) formed with respect to a plane (PL1) perpendicular to an axis of a separator tube by a side surface of the sealing ring groove, which is located on an opening end side of the separator tube, is set to 8° or more. With this, a maximum tensile stress to be applied to an O-ring can be reduced to be smaller than a maximum tensile stress in a case of using a backup ring. As a result, the durability of the O-ring can be set equivalent to or enhanced to be higher than durability in the case of using the backup ring.

9 Claims, 7 Drawing Sheets

(51) Int. Cl.
  *F16F 9/36* (2006.01)
  *F16F 9/32* (2006.01)
  *F16J 15/06* (2006.01)
  *B21D 17/04* (2006.01)
  *F16F 9/06* (2006.01)
  *F16F 9/50* (2006.01)
  *B21H 7/18* (2006.01)

(52) U.S. Cl.
  CPC .............. *F16F 9/06* (2013.01); *F16F 9/3235* (2013.01); *F16F 9/36* (2013.01); *F16F 9/50* (2013.01); *F16J 15/062* (2013.01)

(58) Field of Classification Search
  CPC ..... F16F 9/50; F16F 9/06; F16J 15/062; F16J 15/10
  See application file for complete search history.

(56) References Cited

U.S. PATENT DOCUMENTS

2009/0206558 A1\* 8/2009 Nameki ................. F16J 15/062
  277/644
2014/0090938 A1\* 4/2014 Nishimura .............. F16F 9/062
  188/269

FOREIGN PATENT DOCUMENTS

| JP | 2010-53990 | 3/2010 |
| JP | 2013-15163 | 1/2013 |

OTHER PUBLICATIONS

Office Action issued May 26, 2016 in Chinese patent application No. 201480019287.0 (with partial English translation).

\* cited by examiner

Fig. 10

| θ1 | 2° | 3° | 4° | 5° | 8° | 10° |
|---|---|---|---|---|---|---|
| EVALUATION | × | × | △ | ○ | ○ | ○ |

TUBE AND SHOCK ABSORBER

TECHNICAL FIELD

The present invention relates to a tube and a shock absorber.

BACKGROUND ART

As a shock absorber to be built into a suspension system for vehicles, there is known a shock absorber including a separator tube arranged between a cylinder and an outer tube. For example, in a shock absorber disclosed in Patent Literature 1, the separator tube is fitted to an outer periphery of the cylinder, and a space between both radially shrunk end portions of the separator tube and the cylinder is sealed by sealing rings. Further, sealing ring grooves (housings) each having a substantially quadrangular shape in cross-section and extending in a circumferential direction are formed along an inner periphery of both the end portions of the separator tube. The sealing ring grooves can be formed, for example, by a beading process to be executed on the separator tube having a cylindrical shape.

Incidentally, the beading process refers to a sequential rotational process to be executed through rotation and revolution of a roller die. Thus, a material of the end portions of the separator tube is caused to plastically flow both in the circumferential direction and an axial direction. As a result, acute raised portions are formed along the circumferential direction at groove corners of each of the sealing ring grooves. In this case, the acute raised portions are ignorable when a gap (clearance) between the cylinder and the separator tube is substantially zero. However, in consideration of assembly efficiency, a predetermined gap is secured between the cylinder and the separator tube. Thus, when the shock absorber is in such a state that an internal pressure repeatedly varies intensively on a compression side or a decompression side, the sealing rings are repeatedly protruded slightly from the sealing ring grooves and restored thereto. In this configuration, when backup rings are not used, the slightly protruded portions of the sealing rings repeatedly slide against the acute raised portions. As a result, the sealing rings may be damaged.

CITATION LIST

Patent Literature

[PTL 1] JP 2013-15163 A

SUMMARY OF INVENTION

Technical Problem

The present invention has been made in view of the circumstances as described above, and has an object to enhance durability of sealing rings fitted into sealing ring grooves in a tube having sealing ring grooves formed by a sequential rotational process, and in a shock absorber including the tube.

Solution to Problem

In order to achieve the object described above, according to one embodiment of the present invention, there is provided a tube, including a sealing ring groove formed along an inner periphery on an end portion side of the tube, the sealing ring groove being formed into a substantially quadrangular shape in cross-section to have a bottom surface and a pair of side surfaces facing each other across a sealing ring, at least one of the pair of side surfaces forming an inclination angle of 5° or more with respect to a plane perpendicular to an axis of the tube.

In order to achieve the object described above, according to one embodiment of the present invention, there is provided a shock absorber to be mounted between two members movable relative to each other, the shock absorber including: a cylinder having a working fluid sealed therein; a piston inserted into the cylinder; a piston rod coupled to the piston so as to extend to an outside of the cylinder; an outer tube arranged at an outer periphery of the cylinder; a separator tube provided to surround the outer periphery of the cylinder, the separator tube having a cylindrical side wall forming an annular passage communicating to an inside of the cylinder; a reservoir formed on an outside of the separator tube between the cylinder and the outer tube, the reservoir having the working fluid and a gas sealed therein; and a damping force generating mechanism arranged on an outside of the outer tube, in which the separator tube has a sealing ring groove formed so as to extend in a circumferential direction of the separator tube along an inner periphery of an end portion side of the separator tube, and in which an inclination angle formed with respect to a plane perpendicular to an axis of the separator tube by one of a pair of side surfaces of the sealing ring groove facing each other across a sealing ring, which is located on an opening end side of the separator tube, is larger than an inclination angle formed by another one of the pair of side surfaces, which is located on an opposite side to the opening end side of the separator tube.

Advantageous Effects of Invention

According to the one embodiment of the present invention, the durability of the sealing rings fitted into the sealing ring grooves can be enhanced in the tube having the sealing ring grooves formed by the sequential rotational process, and in the shock absorber including the tube.

BRIEF DESCRIPTION OF DRAWINGS

FIG. 10 is an explanatory table for showing the action of the embodiment of the present invention, specifically, a table for showing results of tests of varying the inclination angle $\theta 1$ in the range of from 2° to 10° to confirm whether or not the acute raised portions are formed at the groove corners of the sealing ring groove at the time of the sequential rotational process.

DESCRIPTION OF EMBODIMENTS

Figure 1:
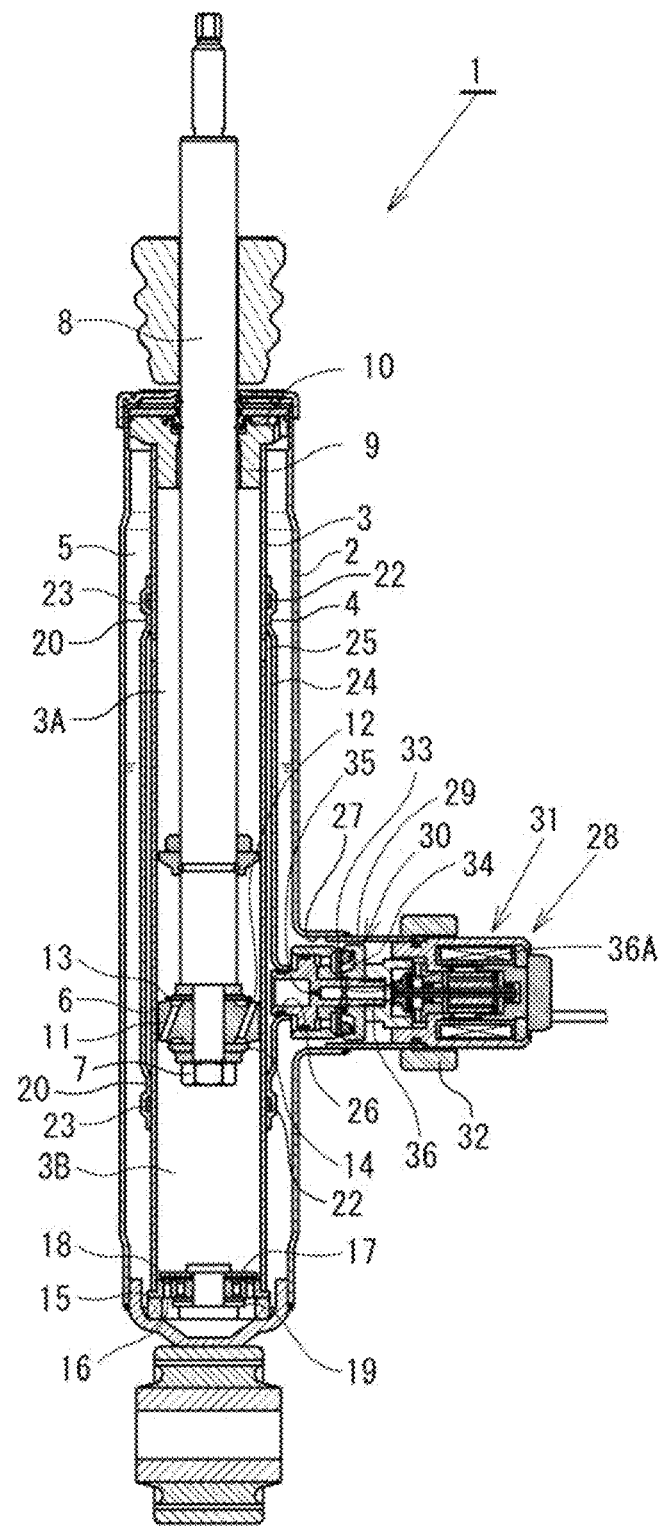
FIG. 1 is a sectional view taken along an axial plane of a damping force adjustable hydraulic shock absorber.

With reference to the accompanying drawings, description is made of an embodiment of the present invention. First, description is made of a damping force adjustable hydraulic shock absorber 1 (hereinafter referred to as "shock absorber 1") of this embodiment. Note that, for the sake of convenience of description, the up-and-down direction in FIG. 1 is defined as an up-and-down direction of the shock absorber 1. As illustrated in FIG. 1, the shock absorber 1 has a double tube structure including an outer tube 2 and a cylinder 3, and a separator tube 4 (tube) is provided to surround an outer periphery of the cylinder 3. Further, a reservoir 5 that is an annular space is formed at an outer portion of the separator tube 4 between the outer tube 2 and the cylinder 3.

A piston 6 is inserted into the cylinder 3 in a slidable manner. The piston 6 is fixed to one end of a piston rod 8 with a nut 7, and partitions an inside of the cylinder 3 into a first chamber 3A and a second chamber 3B. The piston rod 8 extends to an outside of the cylinder 3 through a rod guide 9 and an oil seal 10 that are mounted to the outer tube 2 and an upper end portion of the cylinder 3. The piston 6 includes oil passages 11 and 12 configured to communicate the first chamber 3A and the second chamber 3B to each other. On a surface of the piston 6 on the first chamber 3A side, there is arranged a check valve 13 configured to allow liquid oil to flow only from the second chamber 3B side to the first chamber 3A side through the oil passage 11. Further, on a surface of the piston 6 on the second chamber 3B side, there is arranged a disc valve 14 configured to open when a pressure of the liquid oil on the first chamber 3A side reaches a predetermined pressure, to thereby relieve the liquid oil on the first chamber 3A side to the second chamber 3B side through the oil passage 12.

The shock absorber 1 includes a base valve 15 arranged at a lower end portion of the cylinder 3 to partition the second chamber 3B and the reservoir 5 from each other. The base valve 15 includes oil passages 16 and 17 configured to communicate the second chamber 3B and the reservoir 5 to each other. Further, the base valve 15 includes a check valve 18 configured to allow the liquid oil to flow only from the reservoir 5 side to the second chamber 3B side through the oil passage 16. Further, the base valve 15 includes a disc valve 19 configured to open when a pressure of the liquid oil on the second chamber 3B side reaches a predetermined pressure, to thereby relieve the liquid oil on the second chamber 3B side to the reservoir 5 side through the oil passage 17. Note that, the liquid oil is sealed as a working fluid inside the cylinder 3, and the liquid oil and a gas are sealed inside the reservoir 5.

The separator tube 4 includes sealing ring grooves 22 and 22 (housings) that extend in a circumferential direction along inner peripheries 21 and 21 of both end portions 20 and 20 and allow O-rings 23 and 23 (sealing rings) to be fitted to the sealing ring grooves 22 and 22. When those O-rings 23 and 23 at both the end portions 20 and 20 of the separator tube 4 are brought into close contact with outer peripheries of the cylinder 3, an annular oil passage 24 is formed between the cylinder 3 and the separator tube 4. The annular oil passage 24 is communicated to the first chamber 3A through an oil passage 25 formed at the upper end portion of the cylinder 3. Further, a radially small opening 26 is formed at a lower end portion of the separator tube 4. Still further, a radially large opening 27 arranged correspondingly to the opening 26 is formed through the outer tube 2, and a damping force generating mechanism 28 is mounted to the opening 27 of the outer tube 2.

The damping force generating mechanism 28 includes a cylindrical case 29 fitted to the opening 27. A solenoid valve 31 is fixed to the case 29 with a nut 32. The solenoid valve 31 mainly includes a main damping valve 30 of a pilot type (back pressure type) and a pressure control valve configured to control a valve opening pressure of the main damping valve 30 with a solenoid. The solenoid valve 31 is connected to the opening 26, and generates a damping force by controlling the flow of the liquid oil to the reservoir 5 through the opening 26.

The main damping valve 30 includes a disc valve 33 and a back pressure chamber 34 formed on a back surface side of the disc valve 33. When receiving a pressure of the liquid oil on the opening 26 side, the disc valve 33 is deflected and opened to function as a main valve for allowing the liquid oil on the opening 26 side to flow to the reservoir 5 side. The back pressure chamber 34 applies an internal pressure on the back surface side of the disc valve 33 in a valve closing direction of the disc valve 33. Further, an auxiliary passage 36 is connected to the opening 26 through a fixed orifice 35. The auxiliary passage 36 is communicated to the back pressure chamber 34 through a passage 36A.

Figure 2:
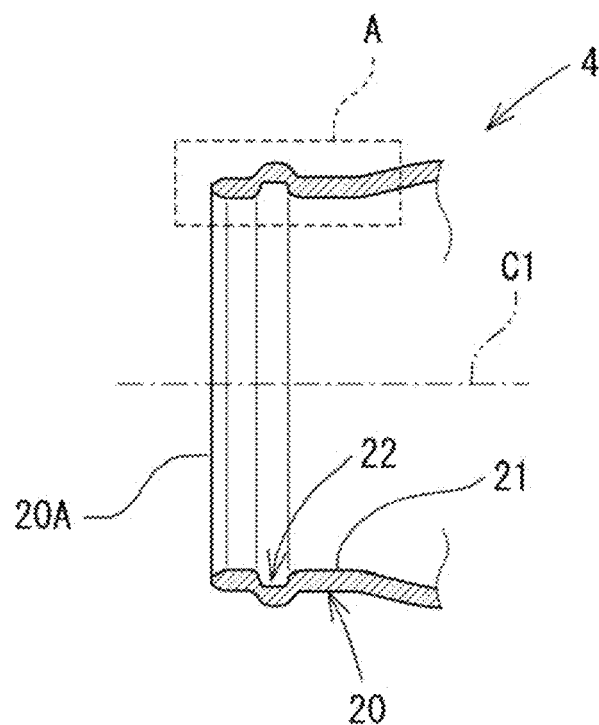
FIG. 2 is a sectional view taken along an axial plane of a separator tube, specifically, a sectional view for illustrating one end portion of the separator tube.

FIG. 2 is a sectional view taken along an axial plane of the separator tube 4 (plane including a center axis C1), specifically, a sectional view for illustrating one end portion 20 of the separator tube 4. Note that, the one end portion 20 and another end portion 20 of the separator tube 4 are vertically symmetrical to each other in FIG. 1. Description is herein made only of the one end portion 20 of the separator tube 4, and description of the another end portion 20 is omitted. The one end portion 20 and the another end portion 20 of the separator tube 4 described in this embodiment are vertically symmetrical to each other, but backup seals may be arranged in front and rear of the sealing ring groove only at the another end portion 20. Further, the sealing ring groove of the another end portion 20 may be formed into a shape different from that of the one end portion. Note that, each of the end portions 20 of the separator tube 4, which has the sealing ring groove 22 formed along the inner periphery 21 by a beading process (sequential rotational process), is radially shrunk in advance by a swaging process.

Figure 3:
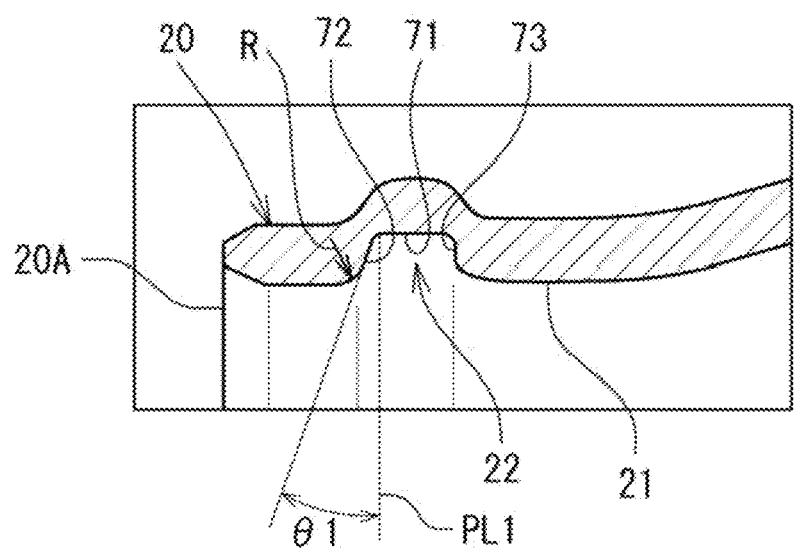
FIG. 3 is an enlarged view for illustrating the portion A in FIG. 2.

As illustrated in FIG. 3, the sealing ring groove 22 is formed into a substantially quadrangular shape in cross-section to have a bottom surface 71 and a pair of side surfaces 72 and 73 facing each other across the O-ring 23 (refer to FIG. 1). Of the pair of side surfaces 72 and 73, the side surface 72 located on an opening end 20A side of the end portion 20 of the separator tube 4 (left side in FIG. 2 and FIG. 3) is opened to the opening end 20A side, and is inclined at an inclination angle θ1 with respect to a plane perpendicular to the axis of the separator tube 4 (one plane PL1 including a straight line orthogonal to the center axis C1). As described later, this inclination angle θ1 is set to 5° or more, specifically, to 20° in this embodiment.

Meanwhile, an inclination angle θ2 (not shown) formed with respect to the plane PL1 perpendicular to the axis by the side surface 73 located on an opposite side to the side surface 72 (right side in FIG. 2 and FIG. 3) is set to range from 0° to 5° in accordance with the housing shapes specified by JIS B 2401. In other words, the inclination angle θ1 formed with respect to the plane PL1 perpendicular to the axis by the side surface 72 located on the opening end 20A side is larger than the inclination angle θ2 formed with respect to the plane PL1 perpendicular to the axis by the side surface 73 located on the opposite side (θ1>θ2). In still other words, the side surface 72 and the side surface 73 are asymmetrical with respect to the plane PL1 perpendicular to the axis, and in addition, the sealing ring groove 22 is asymmetrical with respect to the plane PL1 perpendicular to the axis.

Further, in the sealing ring groove 22, groove corners, that is, connecting portions between opening ends of the sealing ring groove 22 and the inner periphery 21 are rounded. Of the round portion of the groove corner on the side surface 72 side and the round portion of the groove corner on the side surface 73 side of the sealing ring groove 22, the round portion of the groove corner on the side surface 72 side is hereinafter defined as a groove corner round portion R. Note that, the groove corner round portion R and the groove corner round portion on the side surface 73 side of the sealing ring groove 22 conform to housing groove corner round portions specified by JIS B 2401. Further, the sealing ring groove 22 has a rounded housing groove bottom specified by JIS B 2401. Still further, a gap (clearance for securing assembly efficiency) specified by JIS B 2401 is secured between the cylinder 2 (refer to FIG. 1) and each of the inner peripheries 20 of the separator tube 4.

Figure 4:
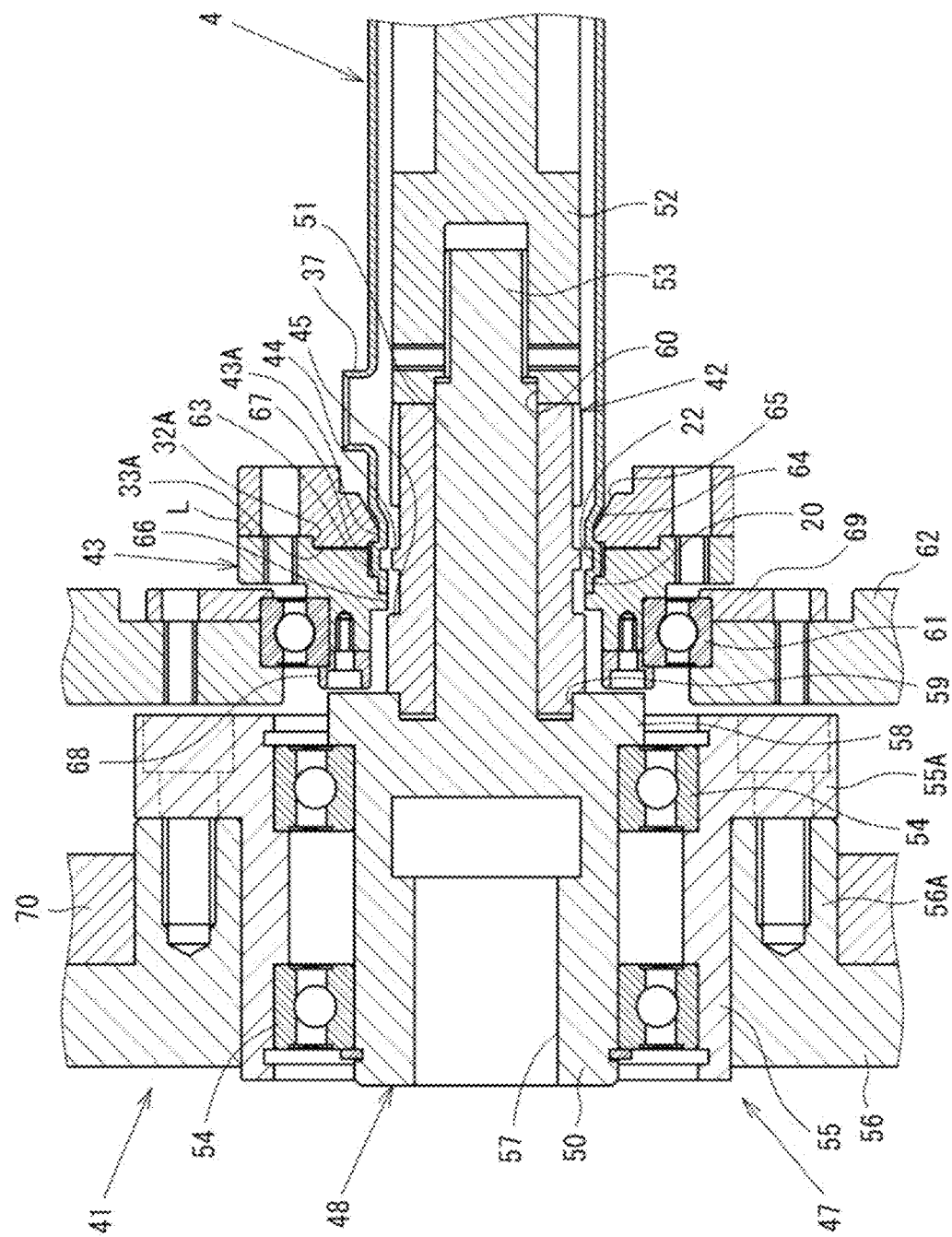
FIG. 4 is an explanatory view for illustrating a beading apparatus configured to execute a sequential rotational process for forming a sealing ring groove along an inner periphery of the end portion of one separator tube, specifically, a sectional view taken along the axial plane of the separator tube.

Next, with reference to FIG. 4, description is made of a beading apparatus 41 configured to execute the beading process (sequential rotational process) so as to form the sealing ring groove 22 along the inner periphery 21 of the end portion 20 of the separator tube 4. Note that, although both the end portions 20 and 20 of the separator tube 4 are processed simultaneously by a pair of the beading apparatus 41, only one of the beading apparatus 41 corresponding to the one end portion 20 of the separator tube 4 is illustrated. Further, for the sake of convenience of description, the up-and-down direction and the right-and-left direction in FIG. 4 are defined as an up-and-down direction and a right-and-left direction of the beading apparatus 41. Note that, both the end portions 20 and 20 of the separator tube 4 need not necessarily be processed simultaneously by the pair of the beading apparatus 41, and both the end portions may be alternately processed by using a single beading apparatus.

Figure 5:
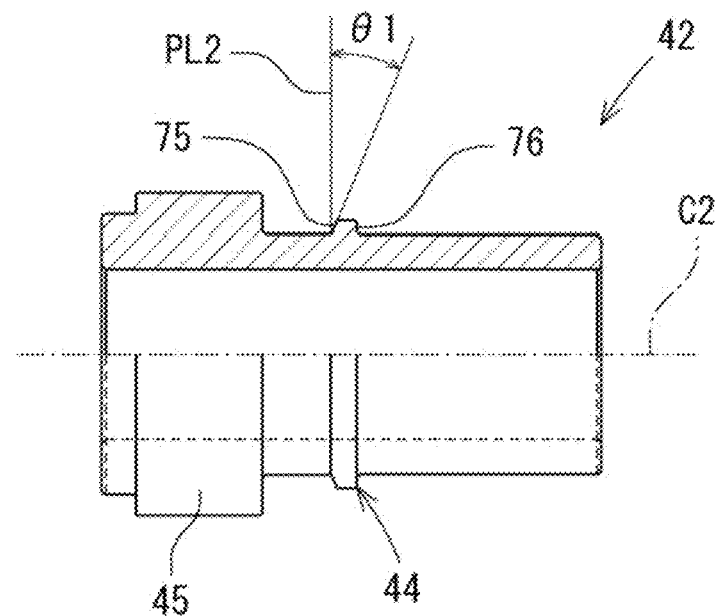
FIG. 5 is an explanatory view for illustrating a roller die to be used in the beading apparatus, in which an upper side with respect to the central axis is illustrated in cross-section taken along the axial plane.

The beading apparatus 41 includes a hollow-shaft roller die 42 to be inserted on the inner periphery 21 side of the end portion 20 of the separator tube 4, and an outer die 43 to be fitted to an outer periphery of the end portion 20 of the separator tube 4. As illustrated in FIG. 5, the roller die 42 includes an annular projecting portion 44 formed so as to extend in the circumferential direction along an outer periphery of the roller die 42. The projecting portion 44 is arranged at an intermediate position of the roller die 42, specifically, an intermediate position in the direction of a center axis C2 of the roller die 42 (right-and-left direction in FIG. 5), and is formed into a substantially quadrangular shape in cross-section taken along an axial plane of the roller die 42.

Further, a side surface 75 of the projecting portion 44 corresponding to the side surface 72 located on the opening end 20A side of the separator tube 4 out of the pair of side surfaces 72 and 73 of the sealing ring groove 22, that is, the side surface 75 located on a side forming the side surface 72 is inclined at the inclination angle θ1 with respect to a plane perpendicular to the axis of the roller die 42 (one plane PL2 including a straight line orthogonal to the center axis C2) with a slope toward a side surface 76 located on the opposite side so as to correspond to the inclination angle θ1 of the side surface 72 of the sealing ring groove 22. Note that, the roller die 42 includes a flange portion 45 formed to have an interval from the side surface 75 of the projecting portion 44 in the direction of the center axis C2 (left direction in FIG. 5).

As illustrated in FIG. 4, the beading apparatus 41 includes a rotary drive mechanism 47 configured to drive and rotate the roller die 42 about the center axis C2 (refer to FIG. 5). The rotary drive mechanism 47 includes a die support portion 48 configured to support the roller die 42, and a servo motor (not shown) serving as a drive source. The die support portion 48 includes a base portion 50 formed into a substantially columnar shape, a first shaft portion 51 having an outer periphery to which an inner periphery of the roller die 42 is fitted, and a second shaft portion 53 to be connected to a regulating member 52. An outer periphery of the base portion 50 of the die support portion 48 is supported by a pair of bearings 54 arranged to have an interval in the direction of the center axis (right-and-left direction in FIG. 4) so that the die support portion 48 is rotatable about the center axis. Note that, the pair of bearings 54 is housed in a bearing case 55 having a substantially cylindrical shape, and a flange portion 55A of the bearing case 55 is fixed to a boss portion 56A of a motor base 56 with bolts.

The die support portion 48 has a hole 57 opened in a left end surface of the base portion 50 so that the die support portion 48 is connected to a rotor shaft (not shown) of the servo motor to be inserted into the hole 57 to allow power transmission therebetween. Further, in the die support portion 48, a flange portion 58 is formed at a right end portion of the base portion 50 so that the bearing 54 on the right side is held in abutment against a left end surface of the flange portion 58. In addition, the flange portion 45 of the roller die 42 is held in abutment against, an inner peripheral side of a right end surface of the flange portion 58. With this, leftward movement of the roller die 42 relative to the die support portion 48 is regulated. In addition, rightward movement of the roller die 42 relative to the die support portion 43 is regulated by the regulating member 52 that is held in abutment against a right end surface thereof. With this, the roller die 42 is positioned in an axial line direction with respect to the outer die 43.

Note that, a left end portion of the roller die 42 is fitted into an annular recessed portion 59 formed in the right end surface of the base portion 50. Further, in the die support portion 48, a distal end portion of the first shaft portion 51 is fitted into a hole 60 formed in an end surface of the regulating member 52. As illustrated in FIG. 4, the outer die 43 is formed into an annular shape, and the roller die 42 is inserted on its inner peripheral side. Further, the outer die 43 is mounted to an outer die-support plate 62 through intermediation of a bearing 61. With this, the outer die 43 is rotatable about a center axis of the outer die 43. In addition, the outer die 43 has a recessed portion 63 corresponding to the projecting portion 44 of the roller die 42.

At a part on an inner side of the outer die 43 and on a right side with respect to the recessed portion 63, there is formed a relief portion 65 configured to avoid interference with a tapered portion 64 of the separator tube 4. Further, at a part on the inner side of the outer die 43 and on a left side with respect to the recessed portion 63, there is formed an abutment portion 66 having an inner diameter smaller than an inner diameter of a reference inner peripheral surface 43A of the outer die 43. The opening end 20A of the end portion 20 of the separator tube 4 is held in abutment against a right end surface of the abutment portion 66. With this, in the separator tube 4, flow of a material at the time of the beading process can be regulated. Note that, under a state immediately after completion of the bearing process, a raised portion 67 formed at the end portion 20 of the separator tube 4 is fitted in the recessed portion 63 of the outer die 43. Thus, the separator tube 4 cannot be released from the outer die 43.

Therefore, the outer die 43 is configured to be divided into four in total, specifically, two in the direction of the center axis (right-and-left direction in FIG. 4) and two in a radial direction (up-and-down direction in FIG. 4), thereby being capable of releasing the separator tube 4 from the die. Note that, the reference symbol 68 in FIG. 4 represents a bearing presser fixed, to the outer die 43 with bolts, which is configured to fix an inner ring of the bearing 61 to the outer die 43. Further, the reference symbol 69 represents another bearing presser fixed to the outer die-support plate 62 with bolts, which is configured to fix an outer ring of the bearing 61 to the outer die-support plate 62. In addition, the reference symbol 70 represents a base plate to which the outer die-support plate 62 is mounted through intermediation of a pair of linear guides.

(Actions and Effects)

Figure 6:
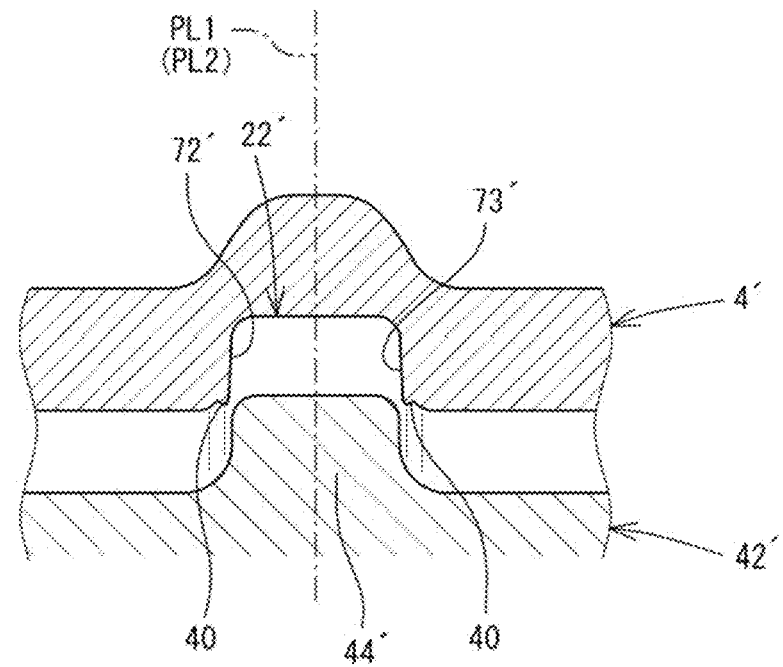
FIG. 6 is a view for illustrating acute raised portions formed at groove corners of a related-art sealing ring groove formed by a beading process.

When a sealing ring groove 22' of a related-art separator tube 4' that is formed to be symmetrical with respect to the plane PL1 perpendicular to the axis illustrated in FIG. 6, specifically, a sealing ring groove 22' in which inclination angles of a side surface 72' and a side surface 73' with respect to the plane PL1 perpendicular to the axis are each set to range from 0° to 5° in accordance with the housing shapes specified by JIS B 2401 is processed by using the beading apparatus 41 described above, acute raised portions 40 and 40 are formed at both groove corners of the sealing ring groove 22'. This is because the separator tube 4' is held by a die, and hence the flow of a material of the separator tube 4' is hindered, at the time of the sequential rotational process. Note that, in FIG. 6, the reference symbol 42' represents a related-art roller die, and the reference symbol 44' represents a projecting portion of the roller die 42'.

Thus, in the shock absorber 1 under the state illustrated in FIG. 1, an internal pressure in the first chamber 3A of the cylinder 3 fluctuates in conjunction with the slide of the piston 6, which causes the O-ring 23 to be repeatedly protruded slightly from the sealing ring groove 22' and restored thereto. In this configuration, when a backup ring is not used, the slightly protruded portion of the O-ring 23 repeatedly slides against the acute raised portions 40 and 40. As a result, the O-ring 23 may be damaged. In addition, the acute raised portions 40 and 40 are more liable to be formed as a groove width of the sealing ring groove 22' is smaller.

As a countermeasure, in this embodiment, the sealing ring groove 22 of the separator tube 4 was formed to be asymmetrical with respect to the plane PL1 perpendicular to the axis. Specifically, as illustrated in FIG. 2 and FIG. 3, of the pair of side surfaces 72 and 73 of the sealing ring groove 22, the side surface 72 located on the opening end 20A side of the separator tube 4 was inclined at the inclination angle θ1 of 5° or more with respect to the plane PL1 perpendicular to the axis of the separator tube 4. With this, the material of the separator tube 4 around the projecting portion 44 of the roller die 42 is allowed to more smoothly plastically flow at the time of the sequential rotational process. Thus, formation of the acute raised portion 40 (refer to FIG. 6) can be suppressed at least at the groove corner on the side surface 72 side of the side surface 72 and the side surface 73 of the sealing ring groove 22.

Figure 7:
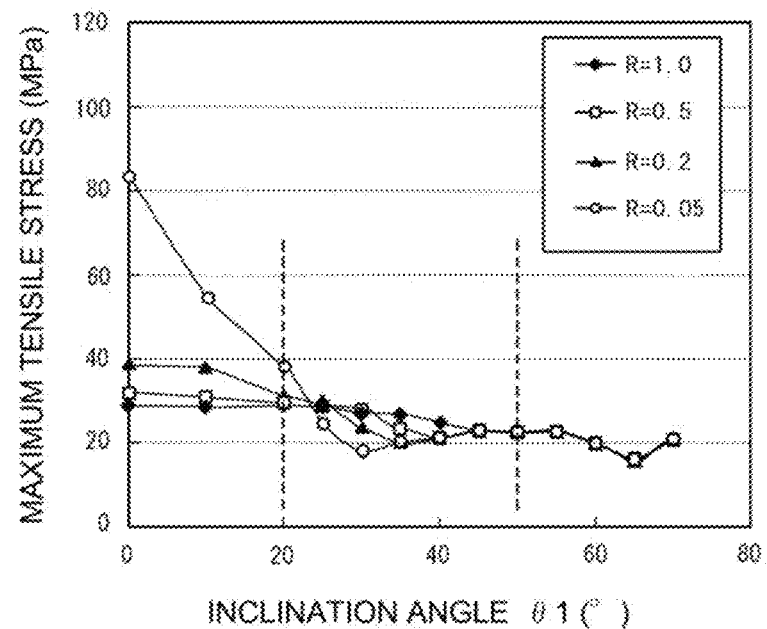
FIG. 7 is an explanatory graph for showing action of an embodiment of the present invention, specifically, a graph for showing a relationship between an inclination angle and a maximum tensile stress to be applied to an O-ring.
Figure 8:
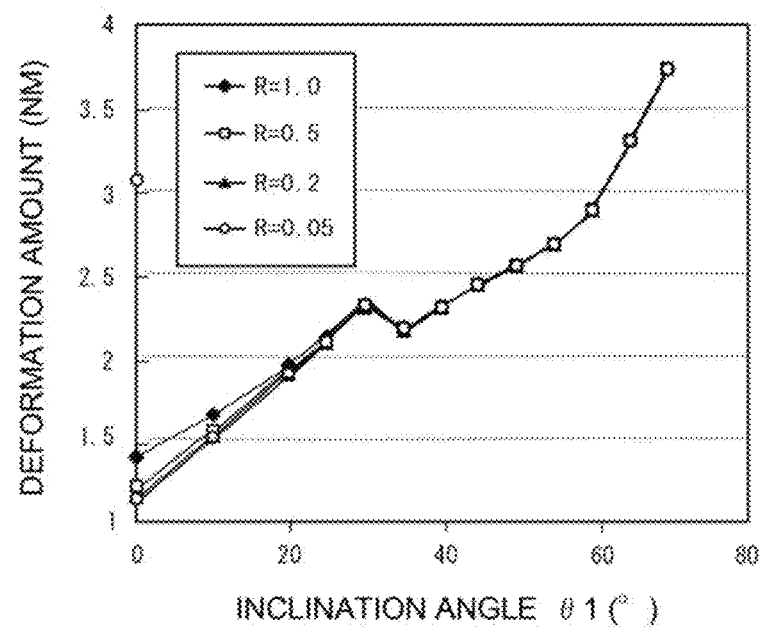
FIG. 8 is an explanatory graph for showing the action of the embodiment of the present invention, specifically, a graph for showing a relationship between the inclination angle and a deformation amount of an end portion of the O-ring.

Next, FIG. 7 is a graph for showing results of tests using a finite element method, specifically, showing a relationship between the inclination angles θ1 of the side surface 72 of the sealing ring groove 22 with respect to the plane PL1 perpendicular to the axis (hereinafter referred to as "inclination angles θ1") and maximum tensile stresses (MPa) to be applied to the O-ring 23 (Material: NBR-90) fitted to the sealing ring groove 22 under a state in which an internal pressure of the separator tube 4 is 20 MPa. Note that, a test result of a maximum tensile stress applied to the O-ring 23 fitted to the related-art sealing ring groove 22' (refer to FIG. 6) in a case of using the backup ring was approximately 110 MPa, which was larger than a maximum tensile stress applied to the O-ring 23 fitted to the sealing ring groove 22 of the separator tube 4 of this embodiment. In other words, durability of the O-ring 23 fitted to the related-art sealing ring groove 22' was lower than that of the O-ring 23 of this embodiment. Further, FIG. 8 is another graph for showing a relationship between the inclination angles θ1 and deformation amounts (mm) of an end portion of the O-ring 23.

With reference to FIG. 7, it is understood that the maximum tensile stress applied to the O-ring 23 tends to be larger as a radius of curvature of the groove corner round portion R of the sealing ring groove 22 is smaller when the inclination angle θ1 ranges from 0° to 20°. This is presumably because, in the range where the inclination angle θ1 is 20° or less, as the radius of curvature of the groove corner round portion R becomes smaller, the stress is applied intensively to a part (recessed portion) of the O-ring 23, which is to be deformed in conformity with the groove corner round portion R.

Figure 9:
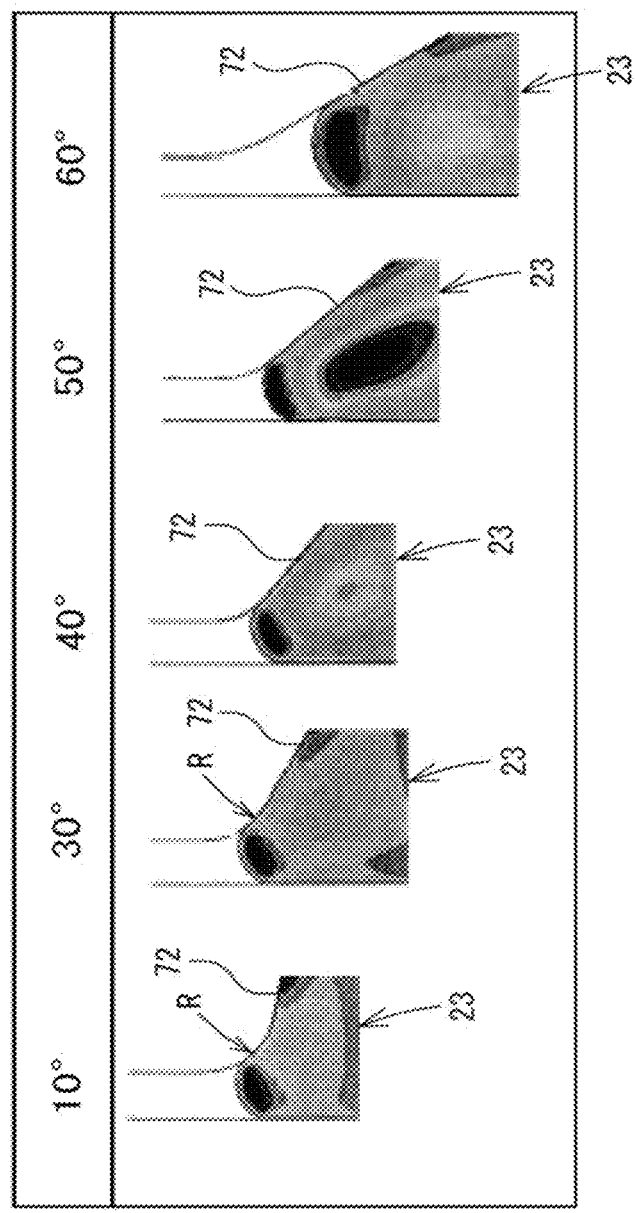
FIG. 9 is an explanatory view for illustrating the action of the embodiment of the present invention, specifically, a view for illustrating deformation patterns of the end portion of the O-ring at the respective inclination angles and distributions of stresses applied to the end portion of the O-ring.

Further, with reference to FIG. 7, it is understood that, when the inclination angle θ1 is a certain angle or larger, the maximum tensile stress applied to the O-ring 23 is less influenced by the groove corner round portion R and is stably maintained to be small. Meanwhile, with reference to FIG. 8, it is understood that the deformation amount is once decreased when the inclination angle θ1 exceeds 30°, and that the deformation amount is increased as the inclination angle θ1 becomes even larger. Specifically, as understood from FIG. 9, when the inclination angles θ1 are 10° and 30°, entry leading edge positions of the O-ring 23 entering a gap between the cylinder 3 and the separator tube 4 are substantially the same as each other. Meanwhile, when the inclination angle θ1 exceeds 40°, the entry leading edge position of the O-ring 23 is retreated, and when the inclination angle θ1 is 60°, the entry leading edge position of the O-ring 23 is further retreated. In other words, a deformation mode starts to vary approximately when the inclination angle θ1 exceeds 30°. When the deformation mode varies, the leading edge position to enter the gap between the cylinder 3 and the separator tube 4 is retreated. As a result, an unnecessary space is formed to increase an axial length, which causes upsizing of the entire cylinder device. In this way, the increase in inclination angle θ1 does not cause problems with the maximum tensile stress. However, the variation of the deformation mode causes the upsizing of the cylinder device, and hence it is desired that a maximum value of the inclination angle θ1 be 30° or less.

Meanwhile, it is desired that, in the sealing ring groove 22, the groove corner, specifically, the radius of curvature of the round portion R of the connecting portion between the opening end of the sealing ring groove 22 and the inner periphery 21 be 0.2 mm or more and 1.0 mm or less. This is because, as demonstrated by the results shown in FIG. 7, when the radius of curvature of the R is 0.05 mm, the maximum tensile stress is maintained to be large until the inclination angle θ1 reaches 20°. When the radius of curvature of the R is 0.05 mm or less, a degree of sandwiching the O-ring 23 between the cylinder 3 and the separator tube 4 is high, and hence the O-ring 23 is significantly influenced at the time of entering the narrow gap between the cylinder 3 and the separator tube 4. Further, when the radius of curvature of the R is increased, the influence on the maximum tensile stress does not vary. However, the deformation mode varies. Thus, for the reason described above, it is desired that the radius of curvature of the R be 1.0 mm or less.

Further, with reference to FIG. 7 and FIG. 8, it is understood that, in the range where the inclination angle θ1 is 50° or more, the maximum tensile stress to be applied to the O-ring 23 is substantially uniform when the radius of curvature of the groove corner round portion R ranges from 0.05 mm to 1.0 mm, and hence is not influenced by the groove corner round portion R. However, although the maximum tensile stress to be applied to the O-ring 23 can be reduced by setting a large inclination angle θ1, as understood also with reference to FIG. 9, the groove width of the sealing ring groove 22 becomes larger as the inclination angle θ1 is set larger. As a result, there arise structural design problems such as a need to extend the end portion 20 of the separator tube 4 in the direction of the center axis. In that case, a volume of the separator tube 4 may not be sufficiently secured. As a countermeasure, when an axial length of the separator tube 4 and the cylinder 3 are extended, there arises a problem in that the axial length of the entire shock absorber 1 is increased to cause the upsizing as a result. In addition, as the inclination angle θ1 becomes larger, the deformation amount of the end portion of the O-ring 23 is increased. As a result, a degree of deflection of the O-ring 23 is increased to cause deterioration in durability of the O-ring 23. In other words, the groove width of the sealing ring groove 22 is increased, and the leading edge position to enter the gap between the cylinder 3 and the separator tube 4 is retreated so that an axial gap is formed. Thus, the separator tube 4 is extended in the axial direction along with the increase in inclination angle θ1. As a result, the cylinder device is upsized. Thus, it is desired that the maximum value of the inclination angle θ1 be 30° or less so that the deformation mode does not vary.

As a countermeasure, in this embodiment, as the inclination angle θ1 of the sealing ring groove 22 capable of securing high durability of the O-ring 23 without causing the structural design problems, the inclination angle θ1 of 5° or more, specifically, the inclination angle θ1 of 20° that was less than 30° at which the deformation mode started to vary was employed.

Figure 10:
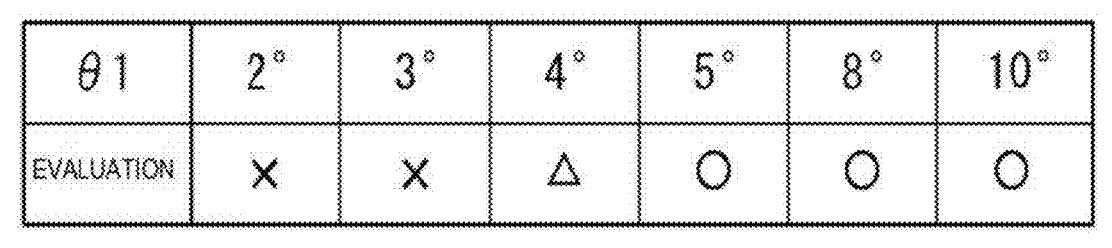

Next, detailed description is made of the reason why the inclination angle θ1 was set to 5° or more. In FIG. 10, there are shown results of tests of varying the inclination angle θ1 in the range of from 2° to 10° to confirm whether or not the acute raised portion 40 was formed at the groove corner of the sealing ring groove 22 at the time of the sequential rotational process. When the inclination angle θ1 was 3° or less, the acute raised portion 40 was formed, and hence the evaluation of "×" was given. When the inclination angle θ1 was 4°, the acute raised portion 40 was scarcely formed but a small raised portion was found when touching the groove corner, and hence the evaluation of "Δ" was given. When the inclination angle θ1 exceeded 5°, no raised portion was found even when touching the groove corner, and hence the evaluation of "o" was given. Those test results demonstrate that the formation of the acute raised portion 40 was suppressed by setting the inclination angle θ1 to 5° or more. Further, in order to secure stable product quality, it is desired that a tolerance of formation of the sealing ring groove 22 by the sequential rotational process be ±2.5°. Thus, it is more desired that the inclination angle θ1 be 8° or more.

According to this embodiment, in the separator tube 4 (tube) having the sealing ring groove 22 formed along the inner periphery 21 of the end portion 20 by the sequential rotational process with the beading apparatus 41, and in the shock absorber 1 including the separator tube 4, the sealing ring groove 22 was formed to be asymmetrical with respect to the plane PL1 perpendicular to the axis of the separator tube 4. The inclination angle θ1 formed with respect to the plane PL1 perpendicular to the axis by the side surface 72 located on the opening end 20A side of the separator tube 4 out of the pair of side surface 72 and side surface 73 facing each other across the O-ring 23 (sealing ring) in the sealing ring groove 22 was set to 8° or more, specifically, the inclination angle θ1 was set to 20°. With this, at the time of the sequential rotational process, the acute raised portion 40 is not formed at the groove corner of the sealing ring groove 22. As a result, a step of removing the acute raised portion 40 can be omitted, and streamlining of manufacturing steps for not only the separator tube 4 but also the shock absorber 1 can be achieved. Further, the maximum tensile stress to be applied to the O-ring 23 can be reduced to be significantly smaller than the maximum tensile stress in the case of using the backup ring. Thus, the durability of the O-ring 23 can be set equivalent to or enhanced to be higher than the durability in the case of using the backup ring. As a result, the backup ring can be omitted, and hence manufacturing cost of the shock absorber 1 can be significantly reduced. In addition, assembly efficiency is enhanced, and hence productivity can be enhanced.

Note that, although the O-ring is used as the sealing ring in the example described above in this embodiment, the present invention is not limited thereto. The present invention is applicable also to sealing rings such as a square ring having a rectangular shape in cross-section and a lip ring having a V-shape in cross-section.

REFERENCE SIGNS LIST 1 shock absorber, 2 outer tube, 3 cylinder, 4 separator tube (tube), 3 reservoir, 6 piston, 3 piston rod, 22 sealing ring groove, 28 damping force generating mechanism

The invention claimed is:

1. A shock absorber to be mounted between two members movable relative to each other, the shock absorber comprising:
    a cylinder having a working fluid sealed therein;
    a piston inserted into the cylinder;
    a piston rod coupled to the piston so as to extend to an outside of the cylinder;

an outer tube arranged at an outer periphery of the cylinder;

a separator tube provided to surround the outer periphery of the cylinder, the separator tube having a cylindrical side wall forming an annular passage communicating to an inside of the cylinder;

a reservoir formed on an outside of the separator tube between the cylinder and the outer tube, the reservoir having the working fluid and a gas sealed therein; and a damping force generating mechanism arranged on an outside of the outer tube, wherein the separator tube has a sealing ring groove formed so as to extend in a circumferential direction of the separator tube, so that an outer periphery of the end portion side of the separator tube is expanded circumferentially, and an inner periphery of an end portion side of the separator tube is concave, and wherein the seal ring groove has a pair of side surfaces facing each other across a sealing ring so that a distance between the pair of the side surfaces is not narrowed but is widened from a bottom of the sealing ring groove toward an opening of the sealing ring groove, an inclination angle formed in a direction in which the distance between the side surfaces is widened with respect to a plane perpendicular to an axis of the separator tube by one of the pair of side surfaces of the sealing ring groove facing each other across the sealing ring, which is located on an opening end side of the separator tube, is larger than an inclination angle formed by the other one of the pair of side surfaces, which is located on an opposite side to the opening end side of the separator tube.

2. A shock absorber according to claim 1, at least one of the pair of side surfaces forming the inclination angle of 5° or more with respect to a plane perpendicular to an axis of the tube.

3. A shock absorber according to claim 2, wherein the inclination angle is set to 8° or more.

4. A shock absorber according to claim 2, wherein the inclination angle is set to 30° or less.

5. A shock absorber according to claim 1, wherein the at least one of the pair of side surfaces and an inner surface of the tube are connected to each other at a connecting portion having a radius of curvature of a round surface of 0.2 mm or more.

6. A shock absorber according to claim 2, wherein the at least one of the pair of side surfaces and an inner surface of the tube are connected to each other at a connecting portion having a radius of curvature of a round surface of 0.2 mm or more.

7. A shock absorber according to claim 3, wherein the at least one of the pair of side surfaces and an inner surface of the tube are connected to each other at a connecting portion having a radius of curvature of a round surface of 0.2 mm or more.

8. A shock absorber according to claim 1, wherein the sealing ring groove is formed by a sequential rotational process.

9. A shock absorber according to claim 2, wherein the sealing ring groove is formed by a sequential rotational process.

* * * * *